(12) United States Patent
Liu et al.

(10) Patent No.: US 7,894,980 B2
(45) Date of Patent: Feb. 22, 2011

(54) METHOD AND APPARATUS FOR ESTIMATING REAL-TIME TRAVEL TIMES OVER A TRANSPORTATION NETWORK BASED ON LIMITED REAL-TIME DATA

(75) Inventors: Zhen Liu, Tarrytown, NY (US); Laura Wynter, Chappaqua, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1066 days.

(21) Appl. No.: 11/052,310

(22) Filed: Feb. 7, 2005

(65) Prior Publication Data

US 2006/0176817 A1    Aug. 10, 2006

(51) Int. Cl.
  *G08G 1/00*       (2006.01)
  *G08G 1/005*      (2006.01)
  *G08G 1/017*      (2006.01)
  *G08G 1/127*      (2006.01)

(52) U.S. Cl. .................. 701/118; 701/117; 701/119; 340/933; 340/934; 340/995.11; 340/995.12; 340/995.13

(58) Field of Classification Search ............... 340/988, 340/995.1, 995.12, 995.13; 342/454, 456; 701/117–119, 200–214
  See application file for complete search history.

(56) References Cited

U.S. PATENT DOCUMENTS

| | | | |
|---|---|---|---|
| 5,610,821 A * | 3/1997 | Gazis et al. .............. 455/456.5 |
| 5,845,228 A * | 12/1998 | Uekawa et al. .............. 701/209 |
| 6,192,314 B1 * | 2/2001 | Khavakh et al. .............. 701/209 |
| 6,222,836 B1 * | 4/2001 | Sekiyama et al. .............. 370/351 |
| 6,253,152 B1 * | 6/2001 | Ito .............................. 701/209 |
| 6,308,177 B1 * | 10/2001 | Israni et al. ................... 701/208 |
| 6,317,686 B1 * | 11/2001 | Ran ............................ 701/210 |
| 6,356,836 B1 * | 3/2002 | Adolph ....................... 701/208 |
| 6,421,606 B1 * | 7/2002 | Asai et al. .................... 701/209 |
| 6,427,114 B1 * | 7/2002 | Olsson ....................... 701/117 |
| 6,459,387 B1 * | 10/2002 | Kobayashi et al. .......... 340/988 |
| 6,484,092 B2 * | 11/2002 | Seibel ........................ 701/209 |
| 6,587,781 B2 * | 7/2003 | Feldman et al. ............. 701/117 |
| 6,615,130 B2 * | 9/2003 | Myr ........................... 701/117 |
| 6,882,930 B2 * | 4/2005 | Trayford et al. ............. 701/117 |
| 7,239,963 B2 * | 7/2007 | Suzuki ....................... 701/211 |
| 2001/0047242 A1 * | 11/2001 | Ohta .......................... 701/210 |
| 2002/0120390 A1 * | 8/2002 | Bullock ...................... 701/117 |
| 2003/0060977 A1 * | 3/2003 | Jijina et al. .................. 701/210 |
| 2003/0167109 A1 * | 9/2003 | Clarke et al. ................... 701/3 |
| 2003/0182051 A1 * | 9/2003 | Yamamoto .................. 701/200 |
| 2003/0191579 A1 * | 10/2003 | Sakamoto et al. ........... 701/202 |

(Continued)

*Primary Examiner*—Jack Keith
*Assistant Examiner*—Jonathan M Dager (57) ABSTRACT

The present invention is a method and an apparatus for estimating real-time travel times or traffic loads (e.g., traffic flows or densities) over a transportation network based on limited real-time data. In one embodiment, a method for estimating a travel time over a transportation network comprising at least a first link and a second link includes receiving a data feed associated with a real-time traffic flow over the first link, estimating a first travel time over the first link based at least in part on the data feed, and estimating a second travel time over the second link, also based at least in part on the data feed. The method assumes that a real-time data feed is not available for the second link, and thus estimates the traffic flow over the second link based on the known traffic flow over the first link and other known data, such as historical traffic patterns and physical parameters of the transportation network.

17 Claims, 8 Drawing Sheets

U.S. PATENT DOCUMENTS

| | | |
|---|---|---|
| 2003/0236615 A1* | 12/2003 | Kuroda et al. ............... 701/208 |
| 2004/0225437 A1* | 11/2004 | Endo et al. .................. 701/209 |
| 2004/0249568 A1* | 12/2004 | Endo et al. .................. 701/209 |
| 2005/0093720 A1* | 5/2005 | Yamane et al. ......... 340/995.13 |
| 2005/0131634 A1* | 6/2005 | Ignatin ....................... 701/202 |
| 2005/0273250 A1* | 12/2005 | Hamilton et al. ............ 701/200 |
| 2006/0106506 A1* | 5/2006 | Nichols et al. ................. 701/3 |
| 2008/0114529 A1* | 5/2008 | Hiruta et al. ................ 701/117 |
| 2008/0140308 A1* | 6/2008 | Yamane et al. .............. 701/200 |
| 2008/0183376 A1* | 7/2008 | Knockeart et al. .......... 701/119 |

* cited by examiner

METHOD AND APPARATUS FOR ESTIMATING REAL-TIME TRAVEL TIMES OVER A TRANSPORTATION NETWORK BASED ON LIMITED REAL-TIME DATA

BACKGROUND

The invention relates generally to transportation networks, and relates more particularly to the incorporation of dynamic data in transportation network calculations.

Figure 1:
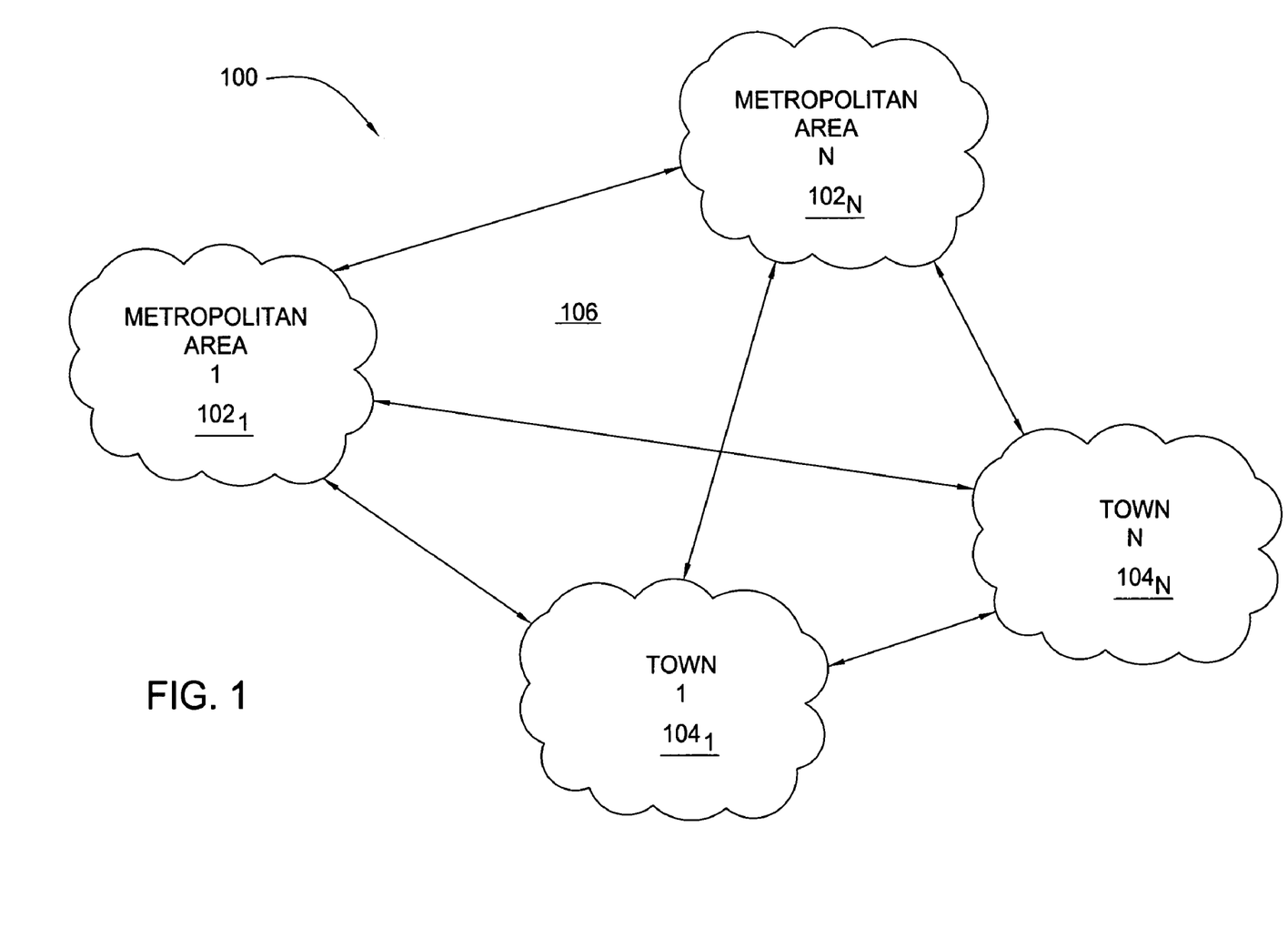
FIG. 1 is a schematic diagram illustrating a typical large-area transportation network.

FIG. 1 is a schematic diagram illustrating a typical large-area transportation network 100. The transportation network 100 comprises a plurality of urban metropolitan areas $102_1$-$102_N$ (hereinafter collectively referred to as "metropolitan areas 102), towns $104_1$-$104_N$ (hereinafter collectively referred to as "towns 104") and inter-urban and/or rural areas (generally designated 106) situated between the metropolitan areas 102 and towns 104. The metropolitan areas 102, towns 104 and inter-urban/rural areas 106 that comprise the transportation network 100 may span a large geographical area (e.g., comprising a plurality of cities, states, regions or countries).

When traveling between locations in a transportation network, it is typically desirable to identify a shortest path, or best (e.g., fastest) route, to travel from an origin to a destination. Conventional applications such as internet mapping and vehicle navigation systems typically compute this best route based on static, non-state-dependent data about links in the transportation network (e.g., speed limits, numbers of lanes, average loads).

A problem with this approach is that dynamic, state-dependent data that may influence travel time (e.g., current traffic conditions or other environmental factors) is not accounted for. Thus, a computed route may not, in fact, be the best route at a given time. Although some methods currently exist that do account for current traffic states, these existing methods are computationally intensive and limited to small or moderately-sized geographic areas. Moreover, these methods do not function well where access to real-time data is limited to only some roads in the transportation network (e.g., as with large urban transportation networks).

Thus, there is a need for a method and apparatus for estimating travel times over a transportation network based on limited real-time data.

SUMMARY OF THE INVENTION

The present invention is a method and an apparatus for estimating real-time travel times or traffic loads (e.g., traffic flows or densities) over a transportation network based on limited real-time data. In one embodiment, a method for estimating a travel time over a transportation network comprising at least a first link and a second link includes receiving a data feed associated with a real-time traffic flow over the first link, estimating a first travel time over the first link based at least in part on the data feed, and estimating a second travel time over the second link, also based at least in part on the data feed. The method assumes that a real-time data feed is not available for the second link, and thus estimates the traffic flow over the second link based on the known traffic flow over the first link and other known data, such as historical traffic patterns and physical parameters of the transportation network.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for end-to-end travel time estimation using dynamic traffic data. Embodiments of the present invention account for real-time, state-dependent data in order to provide more accurate end-to-end estimates and predictions (e.g., shortest paths or best routes) for transportation networks, including wide-area, spatially heterogeneous transportation networks. Thus, embodiments of the present invention may be implemented to advantage in applications such as internet mapping, route guidance, in-vehicle or on-board navigation, fleet routing (e.g., for major carriers or the military) and the like.

As used herein, the terms "shortest path" or "best route" refer to one or more individual links (e.g., road segments) in a transportation network that connect a designated point of origin to a designated destination. Specifically, a shortest path or best route represents the series of links that, if traveled, are expected to allow one to travel from the origin to the destination in the least amount of time (e.g., as compared with alternate paths or routes).

In essence, the methods and apparatuses of the present invention process a plurality of static and dynamic inputs, including link load estimates, current or real-time streaming traffic condition data (e.g., from one or more sources including but not limited to traffic sensors, induction loops, video feeds, cellular telephones and Global Positioning Systems (GPS)), (computed) statistical traffic patterns, real-time environmental data (e.g., weather conditions), radio-based real-time incident data (e.g., data pertaining to events and weather conditions, including traffic and accident reports), (computed) static origin-destination (O-D) matrices and static maps (e.g., digital maps), in order to identify a best route from an origin to a destination in the transportation network.

Figure 2:
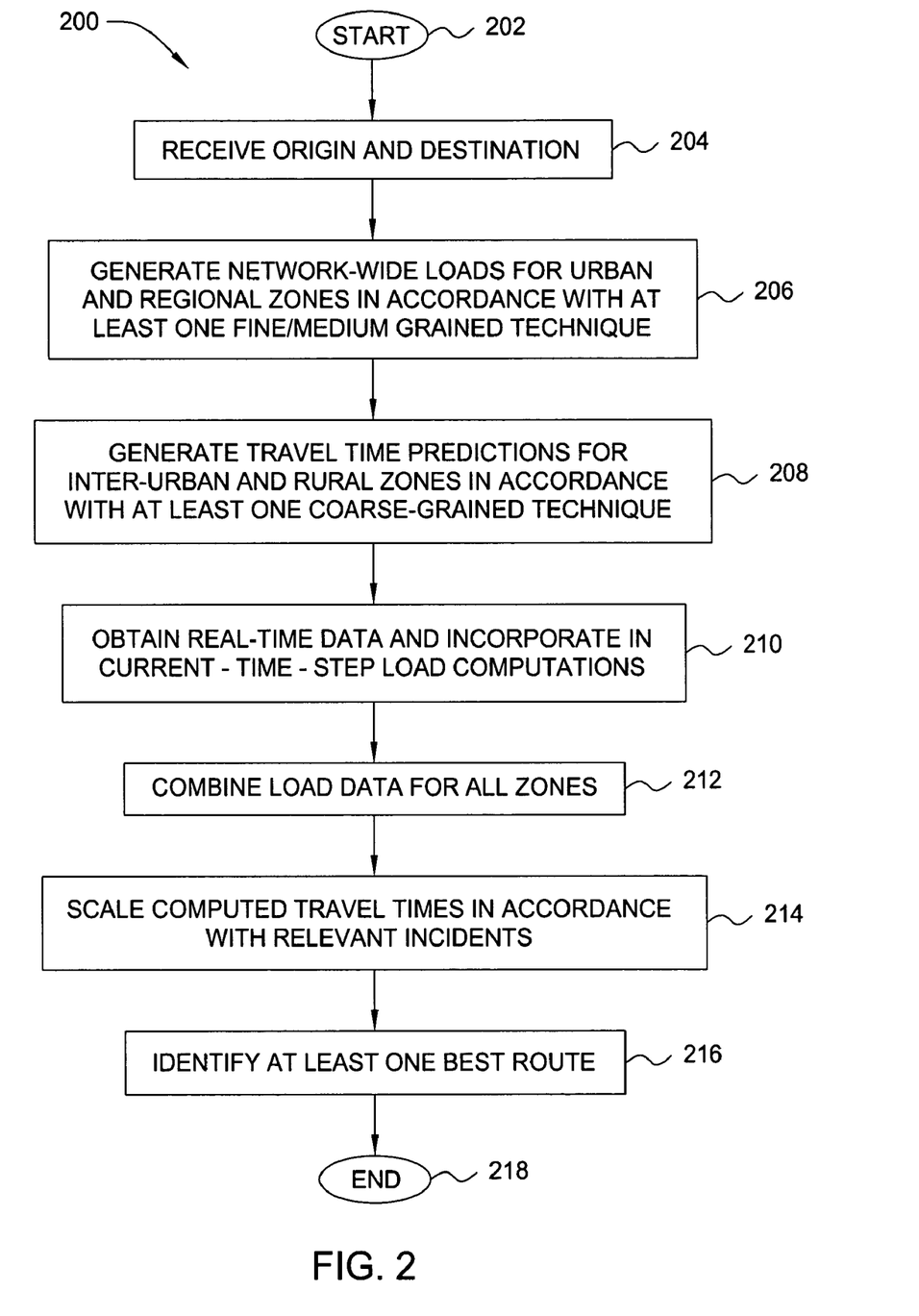
FIG. 2 is a flow diagram illustrating one embodiment of a method for end-to-end route prediction using state-dependent data, according to the present invention.

FIG. 2 is a flow diagram illustrating one embodiment of a method 200 for end-to-end route prediction using state-dependent data, according to the present invention. The method 200 may be implemented, for example, by an internet mapping or vehicle navigation system to generate a best route between two transportation network endpoints (e.g., an origin and a destination) at a given time.

The method 200 is initialized at step 202 and proceeds to step 204, where the method 200 receives, e.g., from a user, a specified origin and a specified destination in the transportation network under consideration.

The method 200 then proceeds to step 206 and generates network-wide loads (e.g., numbers of vehicles per units of time) for the entire urban and regional zones of the transportation network, including highways (e.g., higher-density zones for which real-time traffic data feeds are typically available). In one embodiment, these loads are generated in accordance with a fine- or medium-grained static (non-state-dependent) or dynamic fine load-generation technique (e.g., a technique suitable for assessing regions of fine- or medium-grained spatial dimension). For example, in one embodiment, the loads are generated in accordance with at least one of: static or dynamic traffic assignment, queuing networks, simulation (e.g., as typically used for modeling urban area traffic flows), probabilistic local techniques and flow propagation. In one embodiment, the loads are generated in accordance with at least one input relating to the static or dynamic characteristics of zones under consideration, such as: current or real-time traffic condition data, real-time environmental data (e.g., weather conditions), radio-based real-time incident data (e.g., traffic and accident reports), (computed) statistical traffic patterns, (computed) static origin-destination (O-D) matrices and static maps (e.g., digital maps).

In step 208, the method 200 generates travel time predictions for the entire inter-urban and rural zones of the transportation network under consideration (e.g., lower-density zones for which real-time traffic data feeds may not be available) based on the static or dynamic network-wide data obtained or estimated in step 206. In one embodiment, these predictions are generated in accordance with a coarse-grained load-generation technique (e.g., a technique suitable for assessing regions of coarse-grained spatial dimension). For example, in one embodiment, the travel times are generated in accordance with at least one of: template methods (e.g., as used in predicting the medium and long-term future), statistical traffic classification, traffic assignment, simulation and probabilistic local techniques. In one embodiment, the loads are generated in accordance with at least one input relating to the static or dynamic characteristics of zones under consideration, such as: current or real-time traffic condition data, real-time environmental data (e.g., weather conditions), radio-based real-time incident data (e.g., traffic and accident reports), (computed) statistical traffic patterns, (computed) static origin-destination (O-D) matrices and static maps (e.g., digital maps).

The method 200 then proceeds to step 210 and obtains real-time data, where available, which is then incorporated into the current-time-step load computations generated in steps 206 and 208. In one embodiment, real-time data is not available for all zones of the transportation network. In one embodiment, the obtained real-time data includes at least one of: current or real-time traffic condition data, real-time environmental data and radio-based real-time incident data.

In step 212, the method 200 combines the generated load data for all zones in the transportation network under consideration. In one embodiment, this combination of load data includes converting all loads to travel times. In one embodiment, this conversion is performed in accordance with at least one analytic model. In another embodiment, the information may remain as units of load (e.g., flow or density).

The method 200 then proceeds to step 214 and, where the combined load data has been converted to units of travel time, scales the computed travel times in accordance with any relevant incidents or occurrences (e.g., events and weather conditions) that may affect travel times through the transportation network under consideration (e.g., accidents, construction, special events or occurrences at points of interest in the transportation network, weather and the like). In this way, more accurate, real-time travel times can be estimated.

The method 200 then proceeds to step 216 and identifies at least one best route in accordance with the scaled travel times. In one embodiment, the best route identified by the method 200 is the set of links (road segments) between the specified origin and specified destination over which travel time is expected to be the shortest (e.g., accounting for both the static and dynamic transportation network data).

The method 200 terminates in step 218.

The method 200 is thus capable of processing a plurality of different types of data relating to static and dynamic transportation network characteristics in order to estimate travel times through the transportation network. The method 200 is designed to take advantage of real-time, state-dependent data, where available for a given zone or link, as well as to maximize the use of static, non state-dependent data when real-time data is not available. Thus, the method 200 produces a more accurate current travel time estimate than conventional route planning techniques. Moreover, although the method 200 has been described in the context of calculating a best route for an explicit route request (e.g., between a given origin and a given destination, as received in step 202), those skilled in the art will appreciate that steps 206-214 of the method 200 may be implemented independent of any specific route request, e.g., in order to maintain up-to-date information about the transportation network for future route requests.

Figure 3:
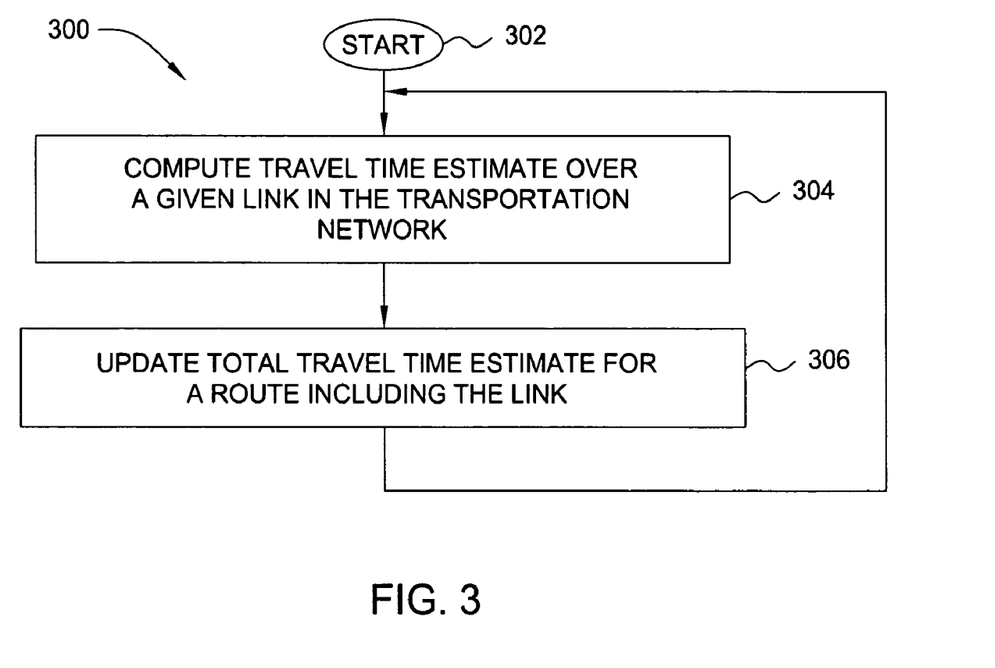
FIG. 3 is a flow diagram illustrating one embodiment of a method for generating travel time predictions for at least one zone of a transportation network.

FIG. 3 is a flow diagram illustrating one embodiment of a method 300 for generating travel time predictions for at least one zone of a transportation network, e.g., in accordance with steps 206 and/or 208 of the method 200. The method 300 is initialized at step 302 and proceeds to step 304, where the method 300 computes the estimated travel time over a given link in the zone, e.g., in accordance with observed (current) or predicted (future) traffic patterns over the link. This estimation may be computed in accordance with any of the methods described above, or in accordance with a template-based statistical method described in further detail with respect to FIG. 4.

Once the estimated travel time has been computed for the link, the method 300 proceeds to step 306 and updates a total travel time estimate for at least one route including the link. The method 300 then returns to step 304 and proceeds as described above, this time computing the estimated travel time over a second link in the transportation network. This iterative process is repeated on a link-by-link basis to obtain a total estimated travel time for a route comprising one or more links.

Figure 4:
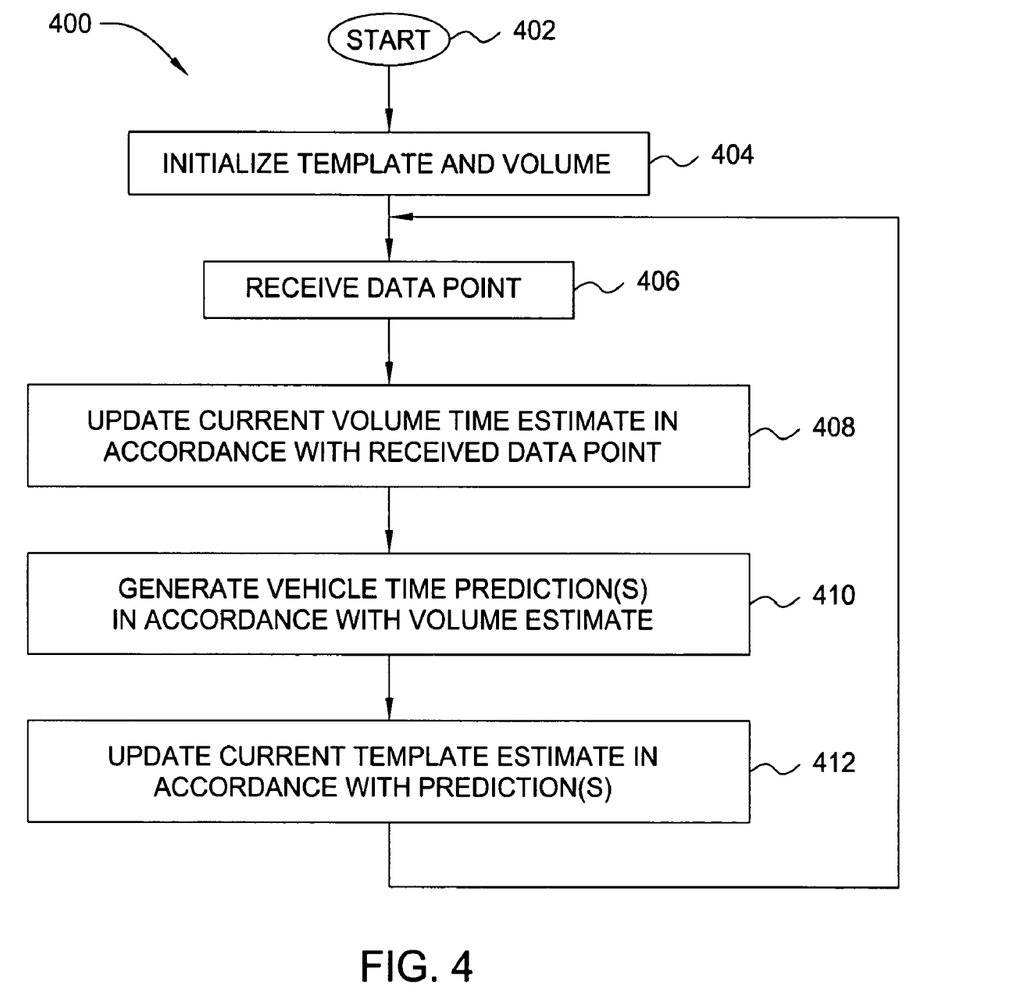
FIG. 4 is a flow diagram illustrating one embodiment of a template-based method for future travel time predictions.

FIG. 4 is a flow diagram illustrating one embodiment of a template-based method 400 for future travel time predictions, e.g., for use in accordance with the method 300 (and therefore steps 206 and/or 208 of the method 200). Specifically, in one embodiment, the method 400 identifies, on a link-by-link basis, the traffic state characteristics (e.g., speed, volume, etc.) that best characterize the progression of that traffic state into the future. Predictions of future travel times over a given link are then made in accordance with the observed traffic state (e.g., "peak weekday traffic volumes typically occur between 8:00 AM and 9:00 AM"). Although the method 400 will be described in the context of predicting travel times for inter-urban and rural zones, those skilled in the art will appreciate that the method 400 may also used to predict travel times for urban zones as well.

The method 400 is initialized at step 402 and proceeds to step 404, where the method 400 initializes a template that will reflect a repeating behavior of a traffic pattern on a given link of the transportation network. In one embodiment, the template maps traffic volume (e.g., numbers of vehicles per unit of time) over a given link versus time, in order to illustrate a traffic pattern. This pattern may represent daily, weekly, monthly, or yearly behavior, or may be tailored over any other useful time horizon. For example, a template representing a daily traffic pattern for a link could comprise twenty-four data points (one for each hour of the day) t(0), . . . , t(23) such that t(0)+ . . . +t(23)=1. In one embodiment, t(0) represents midnight of a given day. From this information, an estimate of travel time over the link at a given time in the future can be derived.

Moreover, templates representing multiple time horizons may be maintained for a single link. In one embodiment, the template initialized in step 402 is associated with an initialized traffic volume of zero, e.g., the initialized template contains no data. Thus, in the example of a daily template above, the template is initialized such that t(0), . . . , t(23)=1/24, v(0)=0 and i=0, where v(i) is the estimate, at time t(i), of the total traffic volume over twenty-four hours, based on information up to time t(i−1).

In step 406, the method 400 receives a data point for incorporation in the template. The data point represents, for example, real-time traffic volume at a given time on the link for which the template is generated. In one embodiment, the data point is a point in an incoming data stream (e.g., where a new data point is received every hour). For example, the data stream could represent the number of vehicles, x, passing by a particular marking point on the link, such that a received data points represents x(i), or the number of vehicles passing the marking point at time t(i).

The method 400 then proceeds to step 408 and updates the current volume estimate for the given time in accordance with the received data point. In one embodiment, the current volume estimate is updated in accordance with a moving average (e.g., an exponentially weighted moving average) that smoothes out jitters in received data and captures gradual data shifts. For example, following the exemplary embodiment of the daily template above, an update of the current volume estimate in accordance with step 408 could involve setting $$v(i+1) = (1-\alpha)v(i) + \frac{\alpha x(i)}{t(i\%24)}$$

where $\alpha$ is a free variable representing the level of sensitivity of the method 400 and has a value between zero and one. In one embodiment, $\alpha$ has a value between 0.4 and 07. The larger the value of $\alpha$, the less sensitive and the more adaptive to changing traffic patterns the method 400 is.

In step 410, the method 400 generates a prediction p(i, j) for the number of vehicles that are expected to pass the marking point at a future time t(i+j), in accordance with the updated volume estimate. In one embodiment, the prediction p(i, j) is generated such that p(i,j)=v(i+1)t((i+j) % 24). Thus, the prediction p(i, j) is based on observed information (e.g., traffic volumes) up to time t(i), at which the prediction p(i, j) is generated.

The method 400 then proceeds to step 412 and updates the current template estimate in accordance with the generated predictions p(i, j) (i.e., computed statistical traffic patterns) and one or more maps of the transportation network including the link. The template estimate is an estimate of the traffic pattern over time (such as an increasing pattern in the morning hours and a decreasing pattern after the evening rush hours). The template t(i) is normalized, as discussed above, so that the sum of t(0)+t(1)+ . . . +t(24) is equal to one. In one embodiment, the current template estimate is updated in accordance with a moving average (e.g., an exponentially weighted moving average) that smoothes out jitters in received data and captures gradual data shifts. For example, following the exemplary embodiment of the daily template above, an update of the current template estimate in accordance with step 412 could involve setting $$t(i) = (1-\beta)t(i) + \frac{\beta x(i\%24)}{x(i)+x(i-1)+\ldots+x(i-23)}$$

where $\beta$, like $\alpha$, is a free variable representing the level of sensitivity of the method 400 and has a value between zero and one. In one embodiment, $\beta$ has a value between 0.4 and 07. The larger the value of $\beta$, the less sensitive and the more adaptive to changing traffic patterns the method 400 is.

The method 400 then returns to step 406, where the method 400 receives a new data point (e.g., where i=i+1) and proceeds as described above in order to adapt the template to ongoing traffic volumes on the link. Thus, the generated travel time estimates are a function of both the composition of the template and the ongoing traffic volume. The method 400 may be repeated link-by-link for each link in the transportation network.

The method 400 therefore learns from past observed traffic patterns and is refined over time using real-time data (e.g., without user input). The method 400 is thus capable of quickly catching up with shifts in trends or traffic patterns. This is especially significant, for example, where an overall traffic volume may shift up or increase in relation to a general observed pattern for a particular day. The method 400 can quickly detect this increase in volume as it develops and adjust predictions for future periods accordingly. Thus, by making use of observed, time-dependent state data in future predictions (as opposed to using average values), more accurate predictions can be generated. In some embodiments, the method 400 is particularly effective in predicting short-, medium- and long-term future conditions.

Figure 5:
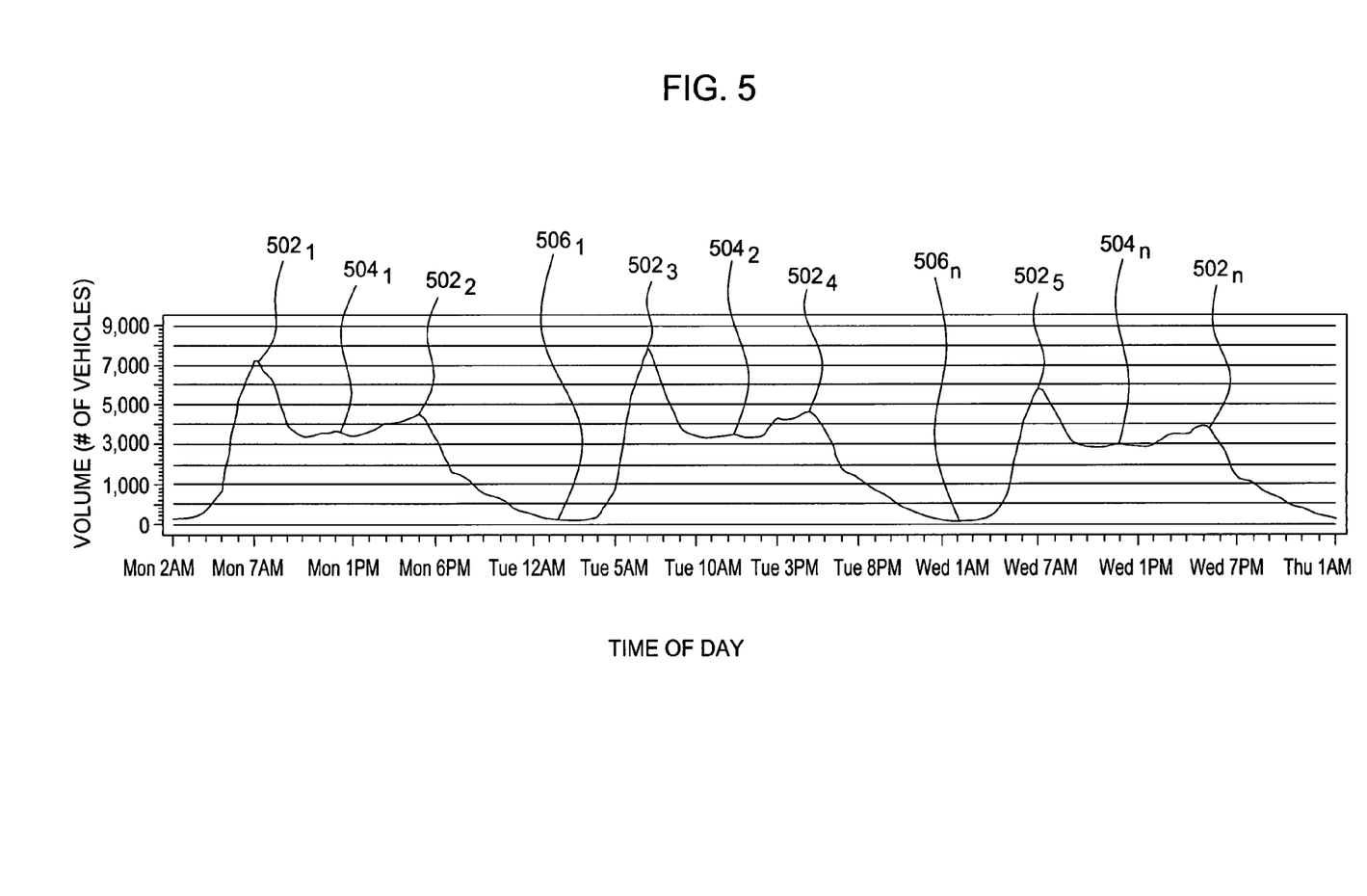
FIG. 5 is a graph illustrating one embodiment of a template for use in accordance with the method.

FIG. 5 is a graph illustrating one embodiment of a template 500 for use in accordance with the method 400. As described above, in one embodiment, the template 500 maps traffic volume (e.g., numbers of cars per unit of time) over a given link versus time (e.g., approximately three days in the case of FIG. 5). Thus, the template may be marked by peaks $502_1$-$502_n$ (hereinafter collectively referred to as "peaks 502") where the traffic volume is greatest (e.g., such as during morning or afternoon rush hours), plateaus $504_1$-$504_n$ (hereinafter collectively referred to as "plateaus 504") where traffic volume remains relatively constant (e.g., between morning and afternoon rush hours), and valleys $506_1$-$506n$ (hereinafter collectively referred to as "valleys 506") where traffic volume is lightest.

As described above, the template 500 thus enables the prediction of future traffic patterns or volumes over a link at a given time based on historical traffic volumes over the same link. Real-time data may be incorporated in the template 500 as the data is received, in order to quickly identify traffic patterns that may deviate from the historical norm and to predict the effects of these changing traffic patterns into the future.

Figure 6:
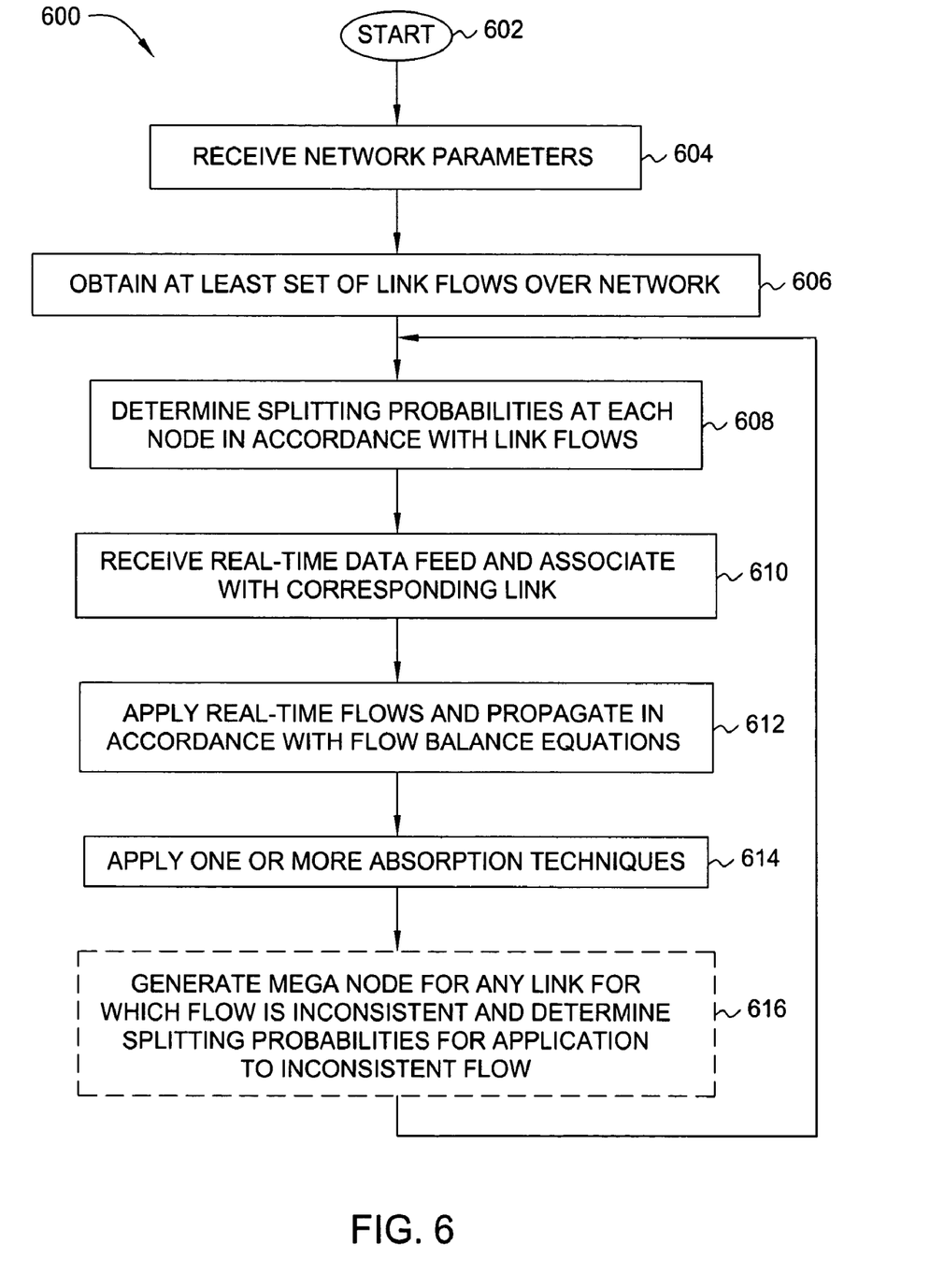
FIG. 6 is a flow diagram illustrating one embodiment of a method for estimating real-time travel times in a transportation network based on limited real-time data.

FIG. 6 is a flow diagram illustrating one embodiment of a method 600 for estimating real-time travel times in a transportation network based on limited real-time data, e.g., for use in accordance with steps 206 and/or 208 of the method 200. Specifically, in one embodiment, the method 600 estimates travel times over links in the transportation network for which link-specific real-time data is not available. Although the method 600 will be described in the context of predicting travel times for urban zones, those skilled in the art will appreciate that the method 600 may also used to predict travel times for inter-urban and rural zones as well.

The method 600 is initialized at step 602 and proceeds to step 604, where the method 600 receives one or more static or dynamic parameters of the transportation network (e.g., links, nodes or intersections of two or more links, free-flow speeds and likely origins and destinations such as parking garages, on-street parking spots and other points of interest).

The method 600 then proceeds to step 606 and obtains at least one set of link flows over the entire transportation network. In one embodiment, more than one set of link flows for the entire transportation network may be obtained, such as one set of link flows for peak periods and one set of link flows for off-peak periods, or one set of link flows for a weekday and one set of link flows for weekends, or separate sets of link flows for different time periods over a typical day or week.

In one embodiment, the link flows may be derived from at least one origin-destination (O-D) trip table (e.g., via trip assignment). In one embodiment, these O-D trip tables are static tables for an average time period on an average day and can be obtained, for example, from the associated metropolitan planning organization. In another embodiment, the O-D trip tables may be time-dependent, or may represent peak or off-peak times, weekday versus weekend, or may be hourly, etc. If the link flows are to be derived from one or more O-D trip tables, then the method 600 computes a traffic assignment for each O-D trip table. In one embodiment, this traffic assignment is computed in accordance with a one-period traffic assignment method, such as a known traffic assignment method. From each traffic assignment, the method 600 can then obtain link flows for all links in the transportation network for the average time period in which the O-D trip table is valid.

In step 608, the method 600 uses the link flows to determine the splitting probabilities at each node in the transportation network, from each incoming link. A splitting probability refers to the percentages of vehicles that go left, right and straight through a given node or intersection. For example, the average case for a given node may dictate that sixty percent of traffic arriving at the node goes straight, thirty percent of the traffic turns right, and ten percent of the traffic turns left. This information is computed and stored for each node in the transportation data, in accordance with the node's average case data (e.g., as obtained from one or more sets of link flows or one or more O-D trip tables).

The method 600 then proceeds to step 610 and receives a real-time data feed associated with a given link in the transportation network (e.g., relating to current traffic volume, flow or speed over the link). This real-time data feed may be received from, for example, a sensor (e.g., a motion sensor, a camera or other real-time data collection mechanism) placed on the link. In one embodiment, such real-time data feeds are available only for a limited number of links in the transportation network. If the real-time data feed is received in speed units, the method 600 converts the value to flow units.

In step 612, the method 600 applies the real-time flows to the computed splitting percentages for each node and propagates the real-time flows throughout the transportation network, in order to estimate the real-time volumes on the links of the transportation network. In one embodiment, the real-time flows are applied to the computed splitting probabilities in accordance with one or more flow balance equations. In one embodiment, this is done using a set of network flows that closely resembles the current time period.

The method 600 then proceeds to step 614 and applies one or more special techniques to account for absorption (e.g., for different types of parking garages, parking meters, points of interest, etc. in the transportation network that may absorb some of the traffic flow on certain links). In one embodiment, absorption is accounted for by deducting a fixed or variable percentage or absolute quantity of load (e.g., flow or density) from the link load at one or more relevant time periods, where the quantity deducted depends on the nature of the attraction points on the link (e.g., parking garages, points of interest, etc.) and the time of day, day of week, etc. For example, load is typically absorbed from a link load when vehicles enter a parking garage on the link. In an analogous manner, traffic generation may be accounted for on those or other links by augmenting the load (e.g., flow or density) on the link in accordance with the time of day, day of week, etc. and the nature of attraction points on the link. For example, load is typically augmented on a link when vehicles exit a parking garage on the link at the end of the work day. In one embodiment, absorption and origin states are changeable over time, for example as parking rules change during the day.

In optional step 616 (illustrated in phantom), the method 600 determines whether inconsistent flow is exhibited on any link in the transportation network and, if so, generates a mega-node (e.g., an artificial node representing—and merging or combining the characteristics of—two or more network nodes, and suppressing the links between those network nodes) incorporating that link. This mega-node is generated dynamically using only observed, real-time flows. The method 600 then determines the updated splitting probabilities for the mega-node and applies these splitting probabilities to the inconsistent link flow.

The method 600 then returns to step 608 and proceeds as described above for a next node in the transportation network.

Figure 7:
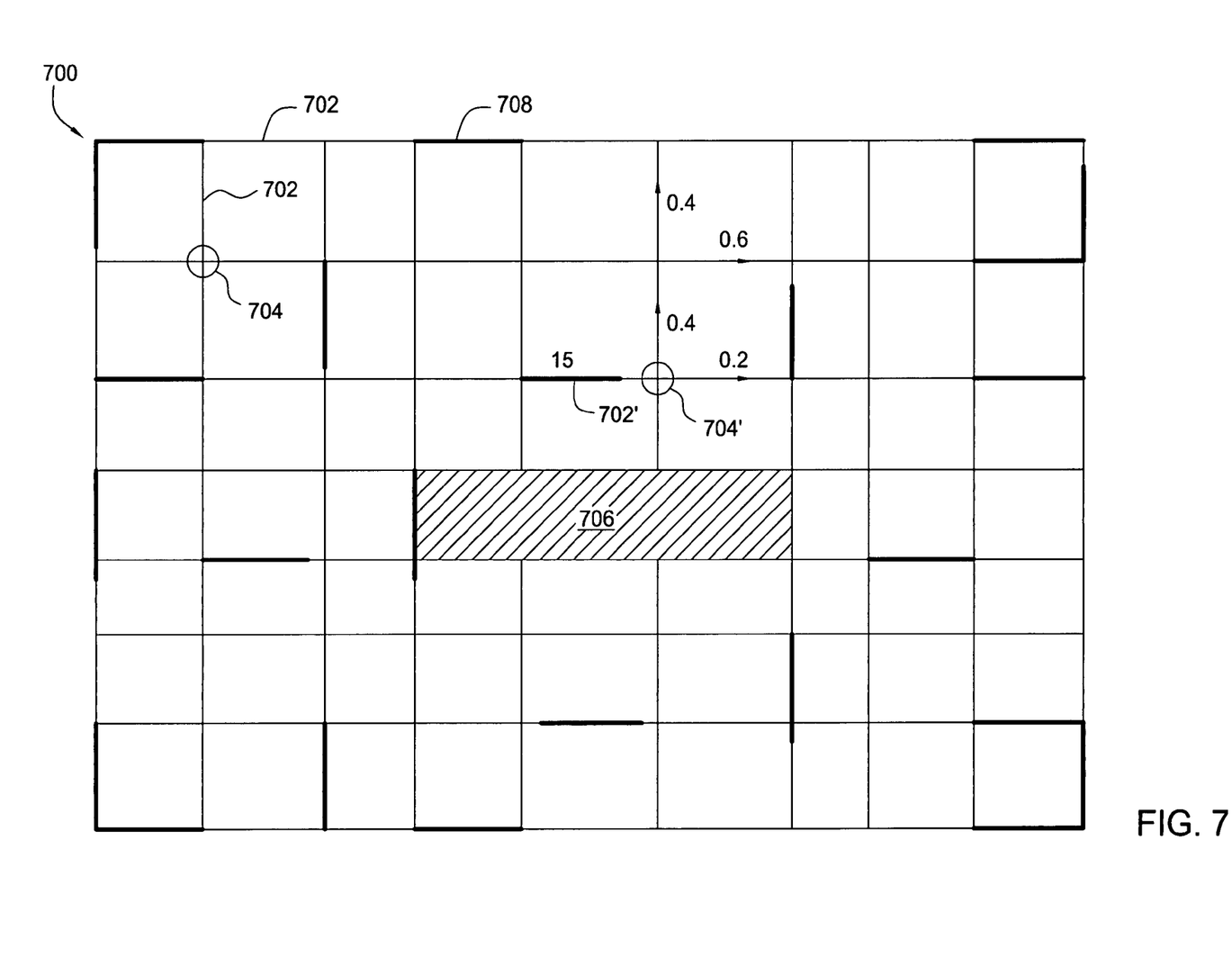
FIG. 7 is a schematic diagram illustrating one embodiment of an exemplary transportation network including a plurality of links and nodes, as well as a park or public space.

FIG. 7 is a schematic diagram illustrating one embodiment of an exemplary transportation network 700 including a plurality of links 702 and nodes 704, as well as a park or public space 706. As further illustrated, some, but not all, of the links 702 are associated with sensors 708 (illustrated as darkened links 702) that provide real-time data feed of current traffic volume, flow or speed over the associated link 702.

As illustrated, a sensor 708 placed along the link 702' may observe a real-time traffic flow over the link 702' of approximately 15 vehicles per second. Moreover, the splitting probabilities for a node 704' including the link 702' may be computed such that twenty percent of the traffic flow from the link 702' is expected to go straight through the node 704' and forty percent of the traffic flow from the link 702' is expected to turn left at the node 704'.

Figure 8:
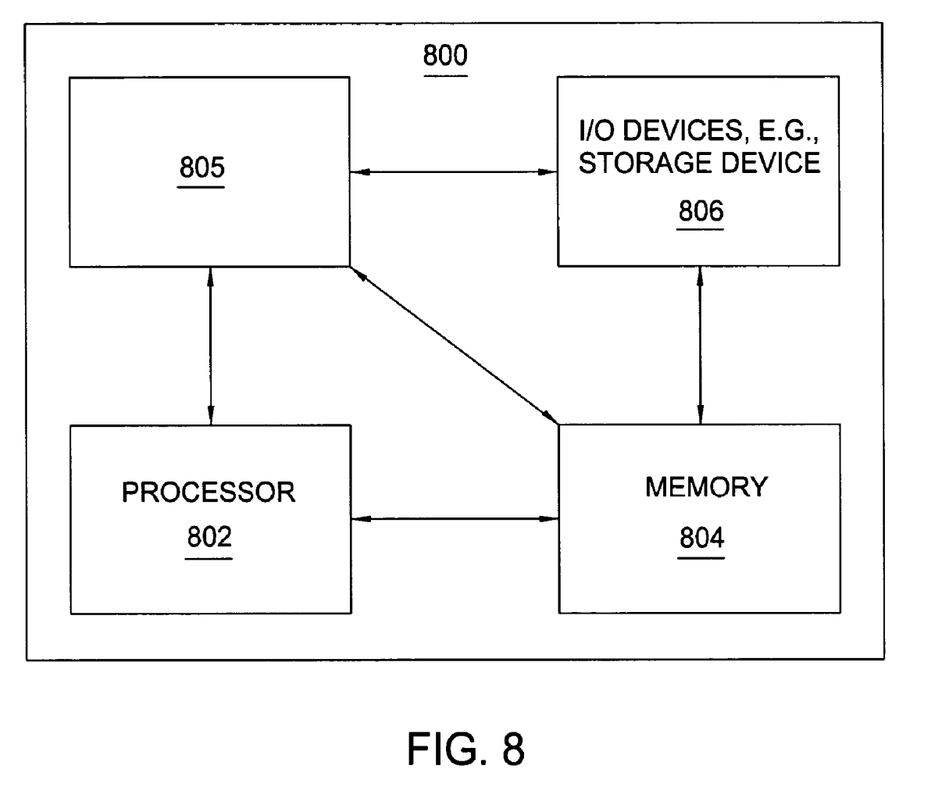
FIG. 8 is a high level block diagram of the present route generation system that is implemented using a general purpose computing device.

FIG. 8 is a high level block diagram of the present route generation system that is implemented using a general purpose computing device 800. In one embodiment, a general purpose computing device 800 comprises a processor 802, a memory 804, a route generator or module 805 and various input/output (I/O) devices 806 such as a display, a keyboard, a mouse, a modem, and the like. In one embodiment, at least one I/O device is a storage device (e.g., a disk drive, an optical disk drive, a floppy disk drive). It should be understood that the route generator 805 can be implemented as a physical device or subsystem that is coupled to a processor through a communication channel.

Alternatively, the route generator 805 can be represented by one or more software applications (or even a combination of software and hardware, e.g., using Application Specific Integrated Circuits (ASIC)), where the software is loaded from a storage medium (e.g., I/O devices 806) and operated by the processor 802 in the memory 804 of the general purpose computing device 800. Thus, in one embodiment, the route generator 805 for generating a best route from an origin to a destination in a transportation network described herein with reference to the preceding Figures can be stored on a computer readable medium or carrier (e.g., RAM, magnetic or optical drive or diskette, and the like).

Thus, the present invention represents a significant advancement in the field of travel time estimation for transportation networks. Embodiments of the present invention assume that real-time data feeds relating to traffic flows are available only for a limited number of links in a transportation network. Real-time traffic flows for links for which real-time data feeds are not available are thus estimated in accordance with the real-time data feeds that are available, as well as with known historical traffic patterns and physical parameters of the transportation network. Thus, substantially accurate estimates of real-time traffic flows can be obtained even for links for which real-time data is not provided.

While foregoing is directed to the preferred embodiment of the present invention, other and further embodiments of the invention may be devised without departing from the basic scope thereof, and the scope thereof is determined by the claims that follow.

The invention claimed is:

1. A method for estimating a travel time over a transportation network comprising a plurality of links including at least a first link and a second link and a plurality of nodes at which two or more of the plurality of links intersect, the method comprising:
   receiving at least one data feed associated with a real-time traffic flow over said first link;
   estimating a first travel time over said first link based at least in part on said at least one data feed;
   estimating a second travel time over said second link based at least in part on said at least one data feed;
   observing data representative of an inconsistent traffic flow on one or more of said first link and said second; and
   responsive to said observing, using said data representative of said inconsistent traffic flow to generate an artificial node in said transportation network that is different from said plurality of nodes, where said artificial node merges one or more characteristics of two or more of said plurality of nodes and incorporates said one or more of said first link and said second link.

2. The method of claim 1, wherein a real-time data feed is not available for said second link.

3. The method of claim 1, wherein said estimating said first travel time and said second travel time comprises:
   obtaining one or more static transportation network parameters; and
   applying said real-time traffic flow to said one or more static transportation network parameters.

4. The method of claim 3, wherein said one or more static transportation network parameters comprise at least one of: a number of links in said transportation network, locations of said links in said transportation network, a number of nodes in said transportation network, locations of said nodes in said transportation network, free-flow speeds in said transportation network, likely origins in said transportation network and likely destinations in said transportation network.

5. The method of claim 3, wherein said receiving further comprises:
   obtaining link flows for all links in said transportation network for an average time period in said transportation network;
   determining splitting probabilities for all nodes in said transportation network in accordance with said link flows; and
   applying said real-time traffic flow to said splitting probabilities for each of said nodes.

6. The method of claim 5, wherein said applying further comprises:
   propagating said real-time traffic flows throughout said transportation network.

7. The method of claim 6, wherein said propagating is performed in accordance with one or more flow balance equations.

8. The method of claim 5, wherein said link flows are derived from at least one origin-destination trip table representative of traffic patterns during said average time period in said transportation network.

9. The method of claim 8, wherein said link flows are derived from a traffic assignment computed for said at least one origin-destination trip table.

10. The method of claim 1, wherein the artificial node suppresses all links between said two or more of said plurality of nodes.

11. The method of claim 1, wherein the artificial node is generated dynamically in accordance with said real-time traffic flow.

12. The method of claim 1, further comprising:
   updating said first travel time and said second travel time in accordance with said artificial node.

13. The method of claim 12, wherein said updating comprises:
   calculating one or more updated splitting probabilities at said artificial node; and
   applying said one or more updated splitting probabilities to said inconsistent traffic flow.

14. The method of claim 1, wherein data regarding a real-time traffic flow over said second link is unavailable.

15. The method of claim 1, wherein said at least one data feed is received from a sensor placed in a location along said first link.

16. A computer readable storage medium containing an executable program for estimating a travel time over a transportation network comprising a plurality of links including at least a first link and a second link and a plurality of nodes at which two or more of the plurality of links intersect, where the program performs steps of:
   receiving at least one data feed associated with a real-time traffic flow over said first link;
   estimating a first travel time over said first link based at least in part on said at least one data feed;
   estimating a second travel time over said second link based at least in part on said at least one data feed;

observing data representative of an inconsistent traffic flow on one or more of said first link and said second link; and responsive to said observing, using said data representative of said inconsistent traffic flow to generate an artificial node in said transportation network that is different from said plurality of nodes, where said artificial node merges one or more characteristics of two or more of said plurality of nodes and incorporates said one or more of said first link and said second link.

17. The method of claim 1, wherein the artificial node is generated using only observed data relating to said real-time traffic flow.

* * * * *